3,301,806
STYRENE-ACRYLATE-ITACONIC ACID LATEX
Leonard F. Guziak, Pittsburgh, and William N. Maclay, Monroeville, Pa., assignors to Koppers Company, Inc., a corporation of Delaware
No Drawing. Filed July 17, 1962, Ser. No. 210,592
2 Claims. (Cl. 260—29.6)

This invention relates to synthetic latices and in particular to a new styrene-acrylate latex having improved properties.

In the co-pending application of L. F. Guziak, Serial No. 191,872, filed May 2, 1962, now U.S. Patent No. 3,232,899, there are disclosed reconstitutable latices useful in the preparation of surface coating compositions comprised by weight of from 20–60 parts of a vinyl aryl monomer, from 10–40 parts of an unsaturated ester, and from 10–40 parts of an unsaturated acid. The water redispersible feature requires a minimum of 10 parts of unsaturated acid.

Quite surprisingly, we have found that a multipolymer composed of a vinyl aryl monomer, an unsaturated ester, and a reduced quantity of a specific unsaturated acid, provides a latex having considerably improved properties over known vinyl aryl monomer-unsaturated ester latices. The new latex, when used as a component in conventional water base baked primers for metallic surfaces, has shown improved intercoat adhesion between the prime coat and an acrylic finished top coat. Further, when used as a component in conventional water based paints, the new latex imparted high scrub resistance to the coating.

It is, therefore, an object of our invention to prepare a new styrene-acrylate latex having improved properties.

In accordance with the invention, we have discovered a new latex composition comprising an aqueous dispersion of a vinyl aryl monomer, an acrylic ester and from 0.5–1.5 percent by weight of itaconic acid. These monomers are copolymerized to produce a grain-free, coagulum-free latex normally having a particle size of from 0.1 to 0.3 micron.

The vinyl aryl monomer of this novel composition may be styrene, o-methylstyrene, m-methylstyrene, p-methylstyrene, ethylstyrene, dimethylstyrene, alpha-methylstyrene, p-chlorostyrene, p-methoxystyrene, and the like; 2, 4-dichlorostyrene, 2,5-dichlorostyrene, p-bromostyrene, alpha-methyl-p-methylstyrene, p-isopropylstyrene, vinyl napthalene, etc. Mixtures of two or more such compounds may be used if desired.

The unsaturated copolymerizable acrylic esters to be used in accordance with the present invention are straight chain or branch chain aliphatic alcohol esters of acrylic or methacrylic acid. The alcohol radicals should be saturated and should contain from 1–20 carbon atoms. When the number of carbon atoms in the alcohol radical exceeds twenty, the resultant latices will dry to form films which will be too soft and too tacky for surface coating applications. Within the limitations set above, a wide variety of acrylic and methacrylic acids may be used. Typical are the esters formed by esterifying acrylic or methacrylic acid with an alcohol, such as ethyl alcohol, butyl alcohol, amyl alcohol, hexanol, 2-ethyl hexanol, 2-methyl pentanol, the oxo-alcohol of an isobutylene dimer, heptyl alcohol, 3-methylheptyl alcohol, the oxo-alcohol of an isobutylene trimer, the oxo-alcohol of a propylene dimer, the oxo-alcohol of a propylene tetramer, cetyl alcohol, dodecyl alcohol, tridecyl alcohol, tetradecyl alcohol, etc. Mixtures of such arcylic or methacrylic acid esters may be used if desired.

At the present time, itaconic acid is the only unsaturated acid useful in this invention. Itaconic acid is a dibasic acid having an activated double bond of the formula:

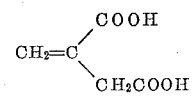

Its higher carboxyl content over other unsaturated acids and its unique beta-carboxyl group are responsible for producing the improved latex of this invention.

The latex of the present invention is produced by interpolymerizing the foregoing components within a specific range of proportions. The vinyl aryl monomer content should comprise by weight of from 50–70 percent of the total monomers, in which the range between 54–58 percent is preferred. The unsaturated ester components should comprise from 29–49 percent by weight of the toal monomer, in which the preferred range is from 41.5 to 45.5. If the percent of unsaturated ester is increased, the film produced is tacky at the lowest film-forming temperatures. On the other hand, if the unsaturated ester component is decreased below the minimum given above, the film does not coalesce except by the addition of external coalescing agents or plasticizers. The itaconic acid content should comprise by weight from 0.5 to 1.5 percent of the total monomer, the preferred range being about 0.5–0.75 percent. Using less than the minimum amount of itaconic acid results in the formation of a latex having unsatisfactory mechanical stability, which is determined by the formation of coagulum during mixing or other mechanical agitation. On the other hand, using more than the maximum amount of itaconic acid results in decreased conversion of the latex to below the acceptable range of 96–100 percent.

Preparation of the novel grain-free, coagulum-free latex is carried out by an aqueous emulsion polymerization reaction. Preferably, the ingredients of the polymerization formulation are premixed to form six essential charges: Reactor charge, catalyst charge A, catalyst charge B, monomer charge I, monomer charge II, and monomer charge III.

The reactor charge comprises essentially the major portion of water used in the reaction, which should be substantially oxygen-free. The total amount of water used can be varied according to the solids content desired in the final latex. It is generally preferred to use a ratio of water to monomer such that a latex, having a solids content, i.e. copolymer, surfactants and electrolytes, of from 40–65 percent, is produced. The preferred range of solids is from 48–55 percent.

The catalyst charge A comprises a major portion of the polymerization catalyst, the emulsifiers and conventional polymerization aids, such as buffers, particle size regulators, activators, etc., dissolved in a minor amount of the water requirement. Useful catalysts for the preparation of the latex are the conventional polymerization catalysts, such as sodium persulfate, potassium persulfate, ammonium persulfate, benzoyl peroxide, lauroyl peroxide, di-t-butyl peroxide, cumene hydroperoxide, azobisisobutyronitrile, etc. Mixtures of two or more such polymerization catalysts may be used if desired. The amount of catalysts to be used is conventional and generally falls within the range of 0.01 to 1 part of polymerization catalyst per 100 parts of monomer mixture. In preparing the catalyst charge, any of the conventional emulsifying agents may be used alone or in admixtures. These include, alklai metal salts of long chain alkyl sulfates and sulfonates, ethylene oxides of long chain fatty acids, alcohols or mercaptans, sodium salts of sulfonated hydrocarbons, alkaryl sulfonates, etc. Representative emulsifiers include compounds such as sodium lauryl sulfate, sulfosuccinic acid esters, the 2-ethylhexyl esters of sulfosuccinic acid, sodium salts of dioctyl sulfosuccinic acid, sodium salts of sulfated cetyl alcohol, and alkylaryl polyethyl alcohol.

Catalyst charge B comprises a sufficient amount of polymerization catalyst dissolved in water to insure substantially complete polymerization, such as a catalyst mentioned useful in catalyst charge A above.

Monomer charge I consists of a minor portion of the vinyl aryl monomer. This is polymerized in the first stage of the latex formation to produce a hard core. Monomer charge II consists of the unsaturated ester and a major portion of the vinyl aryl monomer. This is added subsequently to plate the hard core with a soft shell. Thereafter monomer charge III, consisting of itaconic acid and a portion of the catalyst charge A is added to incorporate carboxyl groups into the copolymer.

The polymerization is advantageously carried out at a pH within the acid range, preferably, for example, the range of 2.5–3.5. After the latex has been prepared, it is desirable to raise the pH to from 8–10. Inorganic or organic bases may be used to adjust the pH of the aqueous solution, such as sodium hydroxide, ammonium hydroxide, potassium hydroxide, monoethanolamine and the like.

In the polymerization process the reactor charge is added to a suitable reaction vessel and heated to a boil to remove oxygen. The temperature is then adjusted to a conventional polymerization temperature, such as between 50 and 100° C., and preferably to a temperature between 85 and 95° C. The polymerization may be conducted under subatmospheric, atmospheric or superatmospheric pressure, although atmospheric pressure is preferred.

The invention is further illustrated by the following examples:

Example I

A grain-free latex was prepared according to the following schedule of charges:

| Reactor charge: | Weight (g.) |
|---|---|
| Water | 520.0 |
| Catalyst charge A: | |
| Water | 291.0 |
| Sodium salt of an alkylaryl sulfonate (28% soln.) | 82.0 |
| Alkylaryl polyether alcohol | 4.5 |
| Sodium pyrophosphate (decahydrate) | 2.5 |
| Potassium sulfate | 2.4 |
| Potassium persulfate | 3.6 |
| Catalyst charge B: | Weight (g.) |
| Potassium persulfate | 0.54 |
| Water | 25.0 |
| Monomer charge I: | |
| Styrene | 183.6 |
| Monomer charge II: | |
| Styrene | 320.4 |
| 2-ethylhexyl acrylate | 391.5 |
| Monomer charge III: | |
| Itaconic acid | 4.5 |
| Catalyst charge A (less 180 ml.). | |

A three-liter glass-lined reaction vessel fitted with a reflux condenser, thermometer and agitator was charged with the reactor charge. After refluxing for 10–15 minutes to remove air, the reactor charge was cooled to the polymerization temperature of 90–92° C. and maintained at this temperature during the course of the reaction. The polymerization reaction was then conducted stepwise as follows:

(1) Catalyst charge A was added incrementally at a rate of 10 ml./10 min. for about 90 minutes. At the same time, monomer charge I was added incrementally at a rate of 10 ml./10 min. for the first 60 minutes and then increased to a rate of 35 ml./10 min.

(2) Monomer charge II was added at a rate of 35 ml./10 min. until the entire charge was added.

(3) After the first 90 minutes of the polymerization, monomer charge III was added incrementally at the rate of 10 ml./10 min. until the entire amount was added. Thereafter the remainder of catalyst charge A was added incrementally over a period of 90 minutes. At the end of all of the above additions, catalyst charge B was added incrementally at the rate of 5 ml./20 min. to completely react traces of residual monomer. Total reaction time was eight hours.

By this process, a grain-free, coagulum-free latex was produced at 90 percent conversion and 50 percent solids. The pH was adjusted to 9.5 with ammonium hydroxide and the latex steam distilled to remove the unreacted monomers. The final product was a white, non-iridescent latex having a viscosity of 31 cps. and a surface tension of 37 dynes/cm. This latex showed good mechanical stability, low foaming, stability to borax, and as a three mil thick dry film on glass, showed tackiness and a minimum film forming temperature of less than 33° F.

Using proportionate quantities of reactants and the same reaction conditions, the process was scaled up to produce 5-gallon and 100-gallon batches. Similar results were also obtained by substituting n-butyl acrylate or n-butyl methacrylate for 2-ethylhexyl acrylate and by substituting alpha-methylstyrene for styrene.

Example II

Using the procedure of Example I, with the exception that the percent of monomer charges was varied,

TABLE I

| No. | Itaconic Acid a | Styrene a | 2-ethylhexyl Acrylate a | Solids b (Theoretical) | Percent Conversion | Mechanical Stability |
|---|---|---|---|---|---|---|
| 1 | 0.00 | 55.0 | 45.0 | 51.0 | 98+ | Unsatisfactory. |
| 2 | 0.25 | 56.0 | 43.75 | 51.0 | 98+ | Do. |
| 3 | 0.50 | 56.0 | 43.5 | c 48.0 | 96 | Very Good. |
| 4 | 0.50 | 56.0 | 43.5 | 51.0 | 98+ | Do. |
| 5 | 1.50 | 55.0 | 43.5 | 51.0 | 97 | Do. |
| 6 | 2.00 | 55.0 | 43.0 | c 48.0 | d 88 | Not Tested. |
| 7 | 2.00 | 55.0 | 43.0 | 51.0 | d 91 | Do. | a Weight percent of the total monomers.
b Weight percent of total latex.
c Lower theoretical solids resulted in decreased percent conversion.
d Percent conversion was so low that the latex was unsatisfactory and no test for mechanical stability was performed.

the certain experiments were performed and the results recorded as shown in the table above.

It may be concluded from the above table that:

(1) The effective range of itaconic acid is between 0.50 and 1.50 percent of the total monomer charged.

(2) The percent conversion is increased at about 51 percent theoretical solids over 48 percent theoretical solids.

Example III.—Exterior Paint

The new latex prepared in Example I was used to make a conventional exterior paint.

Paste recipe: Grams
- Titanium dioxide _____ 582.5
- Calcium carbonate _____ 287.8
- Diatomaceous earth _____ 93.2
- Alkylaryl polyether alcohol _____ 0.9
- Dispersant _____ 15.3
- Ethylene glycol _____ 43.4
- Fungicide _____ 2.3
- Defoamer _____ 0.5
- Water _____ 356.2

This paste was ground and 902.5 g. of latex was added with constant mixing along with a synthetic thickener to thicken the product to 75–78 K.U. viscosity. This prepared about a half gallon having a pigment volume concentration of 42% and total solids content of 56%.

The latex paint was applied as a three mil film to a prime coated glass substrate. After 16 hours at room temperature, scrub resistance was determined with a Gardner Washability Machine. Very little wear was evident after about 15,000 cycles. In comparison, a comparable paint that was compounded with a later containing two parts of methacrylic acid failed at 3000 scrub cycles. The new latex paint showed viscosity stability with time, as evidenced by very little thickening during storage, even after 500 hours at 50° C. Further, this latex paint has been tested for long range outdoor exposure and has shown excellent weatherability.

*Example IV.—Baked Prime Coats on Metals*

The new latex was used to prepare a baked prime coat for metals.

Paste recipe: Grams
- Titanium dioxide _____ 60.2
- Lead silico chromate _____ 150.0
- Barium sulfate _____ 100.0
- Aluminum-silica pigment _____ 56.6
- Black iron oxide _____ 20.0
- Alkylaryl polyether alcohol _____ 2.7
- Butyl carbitol _____ 5.0
- Dispersant _____ 2.0
- Water _____ 178.7
- Total _____ 2875

Vehicle: Grams
- Latex (48% solids) _____ 2285
- Chemically modified drying oil and driers__ 5.25

This paint was cast on zinc phosphated steel panels and baked for 20 minutes at 175° C. Subsequently, these coatings at 1 to 1¼ mil thickness were wet sanded, top coated with an acrylic lacquer, and baked at 80° C. for two hours. The total film thickness was at 2.5 to 3.0 mils. These coatings passed the 80 inch-pound impact and the ⅛ inch flexibility test. In comparison, a comparable paint that was compounded with a latex that contained two parts of methacrylic acid, failed impact and adhesion tests due to lack of intercoat adhesion.

We claim:
1. A coating composition comprising an aqueous dispersions of a copolymer comprising from 29–49 percent by weight of an acrylic ester of the formula:

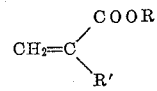

wherein R is a saturated alkyl having from 1–20 carbon atoms and R' is a member of the group consisting of hydrogen and methyl, from 50 to 70 percent by weight of a vinyl aryl monomer of the formula:

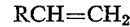

wherein R is a member of the group consisting of phenyl, lower alkyl phenyl, and halophenyl, and from 0.5 to 1.5 percent by weight of itaconic acid.

2. A grain-free, coagulum-free latex composition normally having a particle size of 0.1 to 0.3 micron comprising a copolymer formed by the copolymerization in an aqueous medium of 29–49 parts by weight of 2-ethylhexylacrylate, 50–70 parts by weight of styrene, and 0.5–1.5 parts by weight of itaconic acid.

References Cited by the Examiner

UNITED STATES PATENTS 3,057,812  10/1962  Straughan et al. ____ 260—29.6

MURRAY TILLMAN, *Primary Examiner.*

L. J. BERCOVITZ, *Examiner.*

E. B. WOODRUFF, *Assistant Examiner.*